Jan. 13, 1953　　　　　　R. F. DION　　　　　　2,625,180
PICKING MECHANISM FOR LOOMS
Filed March 30, 1951　　　　　　　　　　　　2 SHEETS—SHEET 1
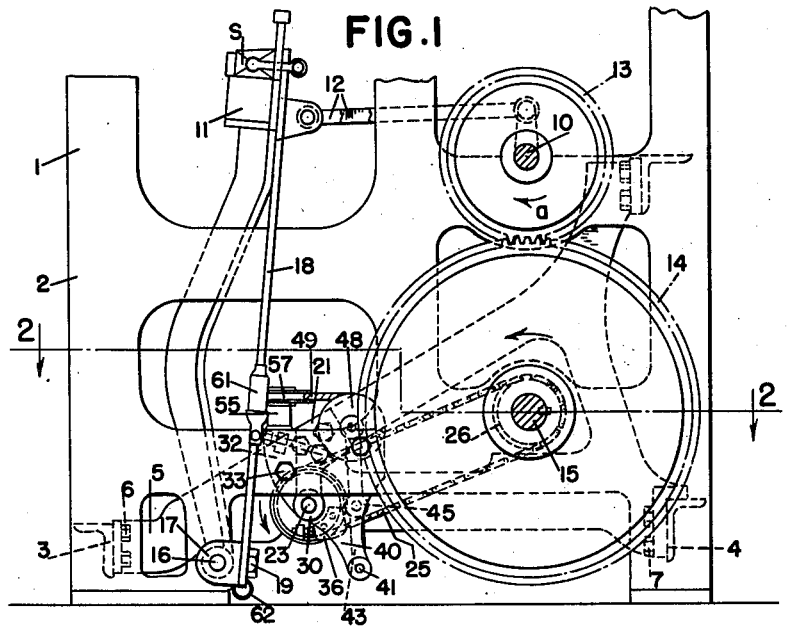
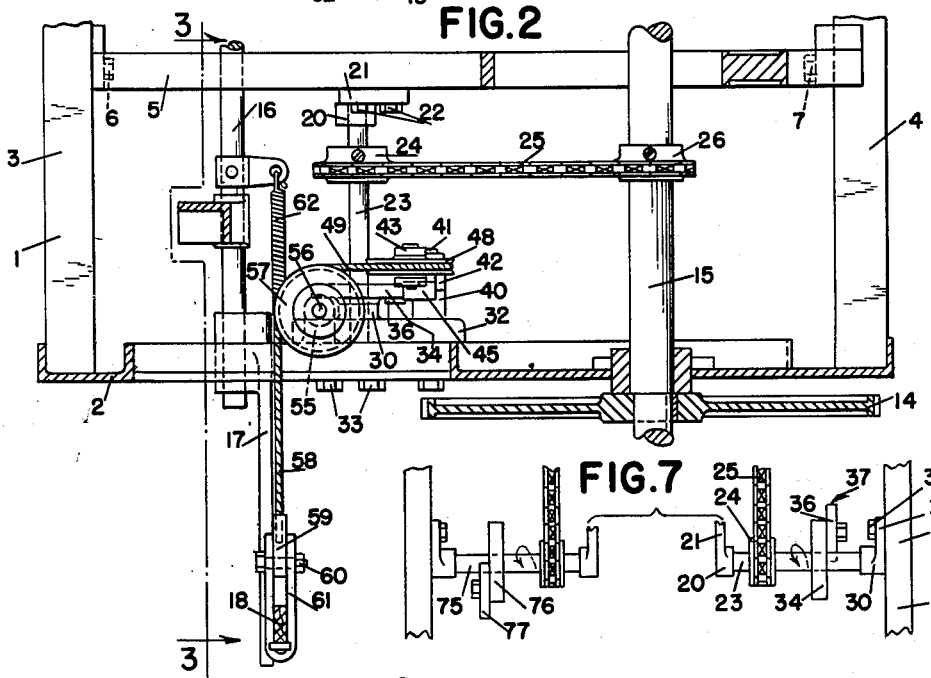
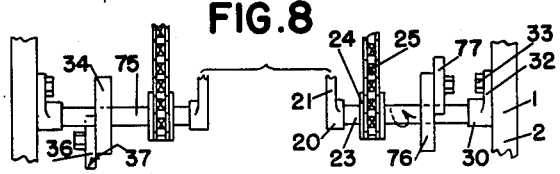
INVENTOR
RAYMOND F. DION
Chas. T. Hawley
ATTORNEY.

Jan. 13, 1953 R. F. DION 2,625,180
PICKING MECHANISM FOR LOOMS
Filed March 30, 1951 2 SHEETS—SHEET 2
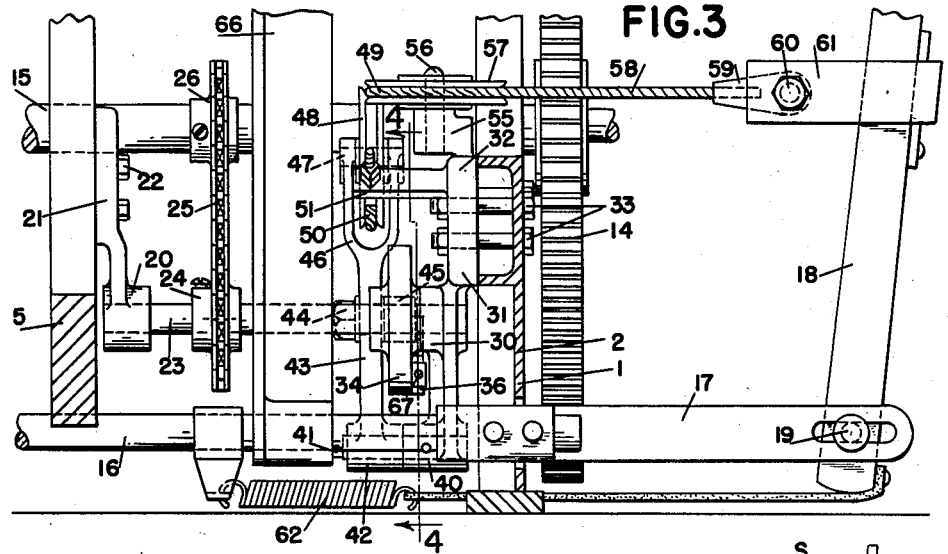
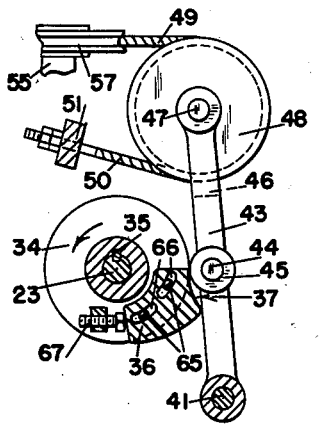
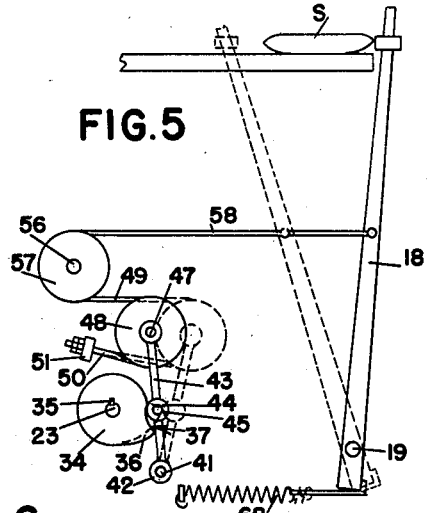
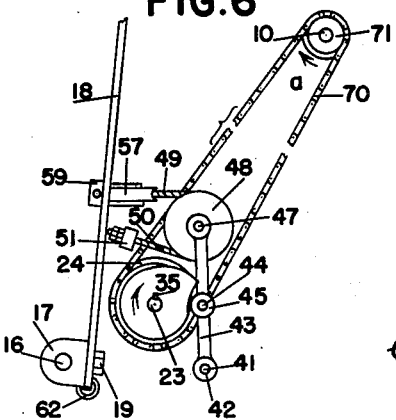
INVENTOR
RAYMOND F. DION
Chas. T. Hawley
ATTORNEY Patented Jan. 13, 1953

2,625,180

UNITED STATES PATENT OFFICE 2,625,180

PICKING MECHANISM FOR LOOMS

Raymond F. Dion, Leominster, Mass., assignor to Crompton & Knowles Loom Works, Worcester, Mass., a corporation of Massachusetts Application March 30, 1951, Serial No. 218,429

15 Claims. (Cl. 139—146)

This invention relates to improvements in shuttle picking mechanism for looms and it is the general object of the invention to provide a picking mechanism wherein a flexible cable transmits the picking force from a cam to the picker stick.

It is customary in certain types of looms to provide a picking shaft extending back and forth in a loom and having a cam secured at the rear end thereof and a power arm secured to its forward end. A cam actuating arm mounted on the bottom shaft of the loom periodically rocks the cam and connections from the power arm to the picker stick give the latter its shuttle picking motion when the cam is rocked. In such motions the picking shaft is likely to be long and subject to some twisting which represents a loss in the power imparted to the cam by its actuator. It is an important object of the present invention to provide a relatively short picking cam shaft parallel to and forward of the main shafts of the loom and drive the picking shaft from one of the main shafts, as for instance, by a chain.

It is a further object of the invention to connect the picker stick to one end of a cable or the like the other end of which is fixed and acts on the cable intermediate its ends by a cam operated actuated sheave or pulley around which the cable is trained.

The picker stick ordinarily moves inwardly toward the center of the loom during its picking operation and it is a further object of the invention to lead the aforesaid cable from the stick around a guide sheave the periphery of which is close to the direction of motion of the stick and then lead the cable to the previously mentioned actuator sheave. The guide sheave is preferably horizontal to maintain guiding relation with the cable as the picker stick swings rearwardly with the lay during a picking operation.

Previous picking mechanisms have generally derived their power from the bottom shaft of the loom and it is a further object of the invention to provide a type of picking mechanism which can be operated from a crank or top shaft of the loom so that the bottom shaft may be eliminated. The driving connection between the main loom shaft and the picking shaft may be a chain trained around a driving sprocket on the main loom shaft and a driven sprocket on the picking shaft. The driving sprocket may be secured either to the bottom shaft if the latter is used, or to the top shaft if the bottom shaft is omitted.

It is a still further object of the invention to provide a picking mechanism for each side of the loom so arranged that if the top shaft drive is used instead of the bottom shaft drive the cams of the picking mechanism can be interchanged to accommodate the reversal of the direction of rotation of the picking shaft incident to the top shaft drive.

With these and other objects in view which will appear as the description proceeds, the invention resides in the combination and arrangement of parts hereinafter described and set forth.

In the accompanying drawings, wherein two forms of the invention are set forth,

Fig. 1 is a side elevation partly in section of a loom having applied thereto a picking mechanism made according to the preferred form of the present invention, Fig. 2 is a horizontal section on line 2—2, Fig. 1, Fig. 3 is an enlarged vertical section on line 3—3, Fig. 2, Fig. 4 is a vertical section, parts being omitted, on line 4—4, Fig. 3, Fig. 5 is a diagrammatic front elevation showing the manner of operation of the invention, Fig. 6 is a diagrammatic view similar to parts of Fig. 1 but showing the modified form of the invention, and Figs. 7 and 8 are diagrammatic plans showing the picking cams and adjacent parts at the right and left hand ends of the loom, Fig. 7 showing the arrangement for the preferred form and Fig. 8 for the modified form.

Each side of the loom will have applied thereto a picking mechanism and since these mechanisms will be similar except that they will be of opposite hand a detailed description will be given of but one of these mechanisms, namely, the one located at the right end of the loom.

Referring to Figs. 1, 2 and 3, the loom frame 1 includes a vertical loomside 2 to which are attached front and back cross girts 3 and 4, respectively. An auxiliary frame 5 extending back and forth in the loom is secured as at 6 and 7 to the front and back girts 3 and 4, respectively. The loom has a top shaft 10 connected in usual manner to the lay 11 by connectors 12 to reciprocate the lay backwardly and forwardly as the top shaft rotates in the direction of arrow $a$, Fig. 1. A gear 13 secured to the top shaft meshes with a second gear 14 of twice its size secured to the bottom shaft 15. Appropriate driving mechanism of usual construction but not shown herein may be provided for driving the top or crank shaft 10, and during loom operation the top shaft 10 will rotate once for each beat or back and forth stroke of the lay and the bottom shaft will complete a rotation every second beat of the lay. A rocker shaft 16 has secured thereto a rocker iron 17 to which a picker stick 18 is pivoted as at 19. The picker stick swings back and forth with the lay during loom operation, the picking operation occurring while the lay is moving rearwardly.

Except as noted hereinafter the matter thus far described may be of usual construction.

Secured to and depending from the auxiliary frame 5, see Fig. 3 is a bearing 20 having a foot 21 secured as at 22 to the auxiliary frame. This bearing has rotatably mounted therein the inner or left end as viewed in Fig. 3 of a short picking shaft 23 substantially parallel to the top and bottom shafts and having secured thereto a driven sprocket wheel 24 meshing with a driving chain 25 trained around a driving sprocket wheel 26 secured to the bottom shaft 15. In the preferred form of the invention, which is applicable to looms of usual construction, the sprocket wheels 24 and 26 are of the same size so that the picking shaft 23 will rotate once for every second beat of the loom.

The right end of picking shaft 23 as viewed in Fig. 3 rotates in a bearing 30 formed as part of a picking mechanism support and bearing member designated generally at 31 and having a base or foot 32 secured as at 33 to the loomside 2. A cam plate 34 is keyed as at 35, see Fig. 4, to the picker shaft 23 and has secured thereto a cam 36 having an inclined or working surface 37. During normal operation of the loom the shaft 23 causes the cam 36 to rotate at a substantial uniform rate and once for every second beat of the loom.

The bearing member 31 has at the lower end thereof and supported from base 32 an arm 40 in which is secured a pivot stud 41 on which is rockably mounted the hub 42 of a cam lever 43. The cam lever has secured thereto a lateral stud 44 on which is rotatably mounted a picking ball or roll 45 for engagement with the cam 36. The cam lever swings in a vertical plane preferably perpendicular to the picking shaft.

The upper part of the cam lever is forked as at 46 and is provided with a stud 47 on which an actuator sheave or pulley 48 is mounted for rotation in a vertical plane parallel to the plane of movement of lever 43. A flexible metallic picking force transmitting cable 49 is trained around part of sheaves 48. One end 50 of the cable is secured to stationary anchor means or arm 51 extending laterally from the stationary foot or base 32.

The bearing member 31 is provided at the upper end thereof with an arm 55 in which is secured a stationary vertical stud 56 on which is rotatably mounted a horizontal guide sheave or pulley 57 around a part of which the cable 49 is trained after leaving the actuator sheave 48. The cable as shown in Fig. 3 has a part 58 thereof leading substantially horizontally from sheave 57 to a head 59 which is connected as at 60 to a lug strap 61 extending around picker stick 18. A return spring 62 normally holds the picker stick in its inactive position shown in full lines in Fig. 5, and also serves the purpose of keeping the cable taut.

In the operation of the preferred form of the invention continuing rotation of the bottom shaft will turn the picker shaft counter-clockwise, Fig. 1, and cause cam 36 by its engagement with picking roll 45 to rock the cam lever 43 periodically from the full line to the dotted line position, Fig. 5, on alternate beats of the loom preferably when the lay is moving rearwardly, to move the picker stick toward the guide sheave to the dotted line position, Fig. 5, to pick the shuttle S to the opposite side of the loom. The roll 45 is at an intermediate point between the pivot of the picking lever 43 and the axis of the actuator sheave 48, so that sheave 48 moves at a rate faster than does roll 45, and sheave 48, acting as a movable pulley, causes the lug strap 61 to move at twice the rate of the movable sheave. Because of these relations the roll 45 will move a much less distance than does the lug strap and the picking incline surface 37 can be more shallow than the usual picking cam in picking mechanisms of prior construction. As shown, there is approximately a 4 to 1 ratio between the motion of the lug strap 61 and that of the picker roll 45.

The picking cam is held to the plate 34 by screws 65 which pass through slots 66 in the cam and are secured into the plate. An adjusting screw 67 may be used to secure fine adjusted settings of the cam 36 with respect to the plate 34, and the screws 65 will hold the cam tightly in adjusted position on the plate. As soon as the cam 36 has passed from the roll 45 the spring 62 will return the picker stick to the full line position shown in Fig. 5.

In the modified form of the invention much of the matter thus far described will be employed, but instead of chain 25 which is driven by the bottom shaft there is a chain 70 trained around a driving sprocket wheel 71 secured to the top or crank shaft 10. Since the picking mechanism at any given side of the ordinary loom operates only on alternate beats, and since the top shaft rotates once for each beat of the loom, the sprocket wheel 71 will be half the size of the sprocket wheel 24 as shown in Fig. 6. When the drive for the picking shaft is derived from the top shaft the previously described bottom shaft 15 can be omitted. In other respects, except for the reversal of cam 36 to be described hereinafter, the modified form of the invention operates in a manner similar to that described for the preferred form of the invention.

When the top shaft 10 is used to drive the picking shafts of the loom it will be necessary to take into account the fact that the direction of turning of the top shaft is opposite to that of the bottom shaft. In Fig. 7 the parts 23, 34 and 36 are the same as already described for the right hand end of the loom, while parts 75, 76 and 77 are corresponding parts for the left hand end when the preferred form of the invention is used. In the modified form the cam plates 34 and 76 will be interchanged, see Fig. 8. In the interchange plate 76 will be removed from shaft 75 and moved to the opposite end of the loom and be attached to shaft 23. The cam 77 will then have its working face on the opposite side from the position previously occupied by face 37 of cam 36 and will be correct for the reverse rotation of shaft 10. Similarly, cam plate 34 will be applied to shaft 75.

From the foregoing it will be seen that the invention sets forth a simple means for utilizing a cable to actuate the picker stick of a loom by mechanism employing a movable actuator sheave or pulley 48 which rocks periodically during loom operation, first to the right, Fig. 5, on a working stroke, and then to the left on a return stroke. The actuator sheave is arranged along the cable intermediate the guide sheave and anchor 51. Spring 62 keeps the cable taut at all times. The guide pulley 57 rotatable horizontally about a stationary axis remains in proper relation with respect to the part 58 of the cable as the picker stick swings back and forth with the lay. It will also be seen that the movable pulley multiplies the picking motion derived from the cam, and that the location of the roll 45 effects still further multiplication of the motion derived from the cam, so that the picking surface 37 can be shallower and subject to less wear than can picking cams of previous construction. When the invention is to be applied to looms of conventional construction the preferred form can be used, since such looms will have bottom shafts, but for looms of new construction, or in old looms where it is desired to remove the bottom shaft, the driving power can be derived from the top shaft as in the modified form. The picking shaft 23 and parts associated with the cable will, however, be the same in both instances, except for the interchange of the cam plates of the mechanisms at the two ends of the loom. The picking mechanism, comprising the two sheaves and cam lever and anchor for the cable, is mounted on the single support member 31 the foot or base 32 of which is fastened to the loom.

Having thus described the invention it will be seen that changes and modifications of the foregoing specific disclosure may be made without departing from the spirit and scope of the invention.

What is claimed as new is:

1. In picking mechanism for a loom having a lay and a picker stick thereon, a flexible cable operatively connected at one end thereof to said picker stick, means holding the other end of the cable fixed, a guide sheave rotatable about a stationary axis and around a part of which the cable is trained, a movably mounted actuator sheave around part of which the cable is trained located along the length of the cable intermediate the guide sheave and said other end of the cable, and means to move the actuator sheave to cause the cable to move the picker stick.

2. In picking mechanism for a loom having a lay and a picker stick thereon, a flexible cable operatively connected at one end thereof to said stick, means holding the other end of the cable fixed, a guide sheave rotatable about a fixed axis around part of which the cable is trained, a movably mounted actuator sheave around part of which the cable is trained located along the length of the cable intermediate the guide sheave and said other end of the cable, and means operatively connected to the actuator sheave having periodic movements during loom operation to effect periodic movement of the actuator sheave to cause the cable to move the picker stick.

3. The structure set forth in claim 2 wherein said one end of the cable moves in a generally horizontal direction to move the picker stick and the guide sheave rotates in a substantially horizontal plane.

4. The structure set forth in claim 2 wherein the lay and picker stick thereon swing backwardly during the picking operation of the loom and the guide sheave rotates in a substantially horizontal plane.

5. The structure set forth in claim 2 wherein a stationary bearing member supports the guide sheave and the last named means includes a cam operated lever pivoted on the bearing member supports the actuator sheave.

6. The structure set forth in claim 2 wherein a stationary bearing member supports both the guide and actuator sheaves and has said other end of the cable fixed thereto.

7. The structure set forth in claim 2 wherein the loom has a stationary bearing member, a picking shaft supported partly by the bearing member, and the last named means includes a cam lever pivoted on the bearing member, and a cam on the shaft to operate the cam lever.

8. In picking mechanism for a loom having a picker stick and a picking shaft which rotates during loom operation, a bearing member stationary on the loom having one end of said shaft rotatable thereon, a cable having one end thereof fixed to the bearing member and having the other end thereof operatively connected to the picker stick, a guide sheave for the cable rotatable on the bearing member, a lever pivoted on the bearing member, means operative periodically due to rotation of said shaft to give said lever operative movements, and an actuator sheave rotatable on the lever operatively engaging the cable intermediate the guide sheave and the end of the cable fixed to the bearing member effective when having said operative movements thereof to cause the cable to move the picker stick.

9. The structure set forth in claim 8 wherein said means includes a cam secured to the shaft and a picking roll rotatable on the lever and positioned for engagement with said cam.

10. In a picking mechanism support member for a loom having a flexible cable connected to a picker stick, a base for attachment to the loom, a guide sheave for the cable, means on the base mounting the sheave for rotation, a lever, means on the base providing a pivotal mounting for the lever, an actuator sheave for the cable rotatable on the lever, and an anchor means on the base for one end of the cable.

11. In a picking mechanism support member for a loom having a picking shaft and a flexible cable connected to a picker stick, a base for attachment to the loom, a guide sheave for the cable, means on the base mounting the guide sheave for rotation, a lever, a pivot stud for the lever supported by the base, an actuator sheave for the cable rotatable on the lever, an anchor means on the base for one end of the cable, and a bearing for the shaft on the base.

12. In a picking mechanism support member for a loom having a flexible cable connected to a picker stick, a base for attachment to the loom, a guide sheave for the cable rotatable on the base in a horizontal plane when the base is secured in position on the loom, a pivotal support on the base, a lever pivoted on the pivotal support to swing in a vertical plane when the base is secured in position on the loom, and an actuator sheave for the cable rotatable on the lever in a plane parallel to the plane of movement of the lever.

13. In a picking mechanism support member for a loom having a picking shaft and a flexible cable connected to a picker stick, a base for attachment to the loom, a guide sheave for the cable, means on the base mounting the sheave for rotation, a lever supported by and mounted for pivotal movement relative to the base, an actuator sheave for the cable rotatable on the lever, an anchor means on the base for one end of the cable, and a bearing on the base for the shaft having an axis perpendicular to the plane of movement of the lever.

14. In picking mechanism for a loom having a picker stick and a loom shaft, a picking shaft parallel to the loom shaft, sprocket wheels on the shafts, a driving chain meshing with the sprocket wheels to rotate the picking shaft from the loom shaft, a cam on the picking shaft, a cam lever mounted to swing in a plane perpendicular to the shafts, an actuator sheave on the lever rotatable on the latter in a plane parallel to the plane of movement of the lever, a cable trained around part of said sheave operatively connected at one end thereof to said picker stick and having the other end thereof fixed, and a guide sheave intermediate the actuator sheave and picker stick around a part of which the cable is trained and from which the cable leads to the picker stick in a direction substantially parallel to said shafts.

15. In a loom having bottom and top shafts rotating in opposite directions and having also a picking cam plate for each end of the loom capable of rotation in one direction by the bottom shaft or in the opposite direction by the top shaft, two picking actuator mechanisms, one for each cam plate, one of said mechanisms at one end of the loom being right hand and the other mechanism at the opposite end of the loom being left hand, and a cam forming part of each mechanism secured to the corresponding picking plate, the picking plates when rotating in said one direction being located at their respective ends of the loom and said picking plates when rotating in said opposite direction being interchanged and reversed end for end.

RAYMOND F. DION.

REFERENCES CITED

The following references are of record in the file of this patent:

UNITED STATES PATENTS

| Number | Name | Date |
|---|---|---|
| 952,096 | Brehio | Mar. 15, 1910 |
| 1,006,110 | Mann | Oct. 17, 1911 |
| 1,322,857 | Wojtasiewicz et al. | Nov. 25, 1919 |
| 2,336,876 | Magee | Dec. 14, 1943 |